(12) United States Patent
Ueda

(10) Patent No.: US 10,649,190 B2
(45) Date of Patent: May 12, 2020

(54) CASSEGRAIN REFLECTOR RETENTION MECHANISM, MICROSCOPE EQUIPPED WITH SAME, AND METHOD FOR ATTACHING CASSEGRAIN REFLECTOR

(71) Applicant: Shimadzu Corporation, Kyoto (JP)

(72) Inventor: Atsushi Ueda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 236 days.

(21) Appl. No.: 15/580,477

(22) PCT Filed: Jun. 11, 2015

(86) PCT No.: PCT/JP2015/066816
§ 371 (c)(1),
(2) Date: Dec. 7, 2017

(87) PCT Pub. No.: WO2016/199262
PCT Pub. Date: Dec. 15, 2016

(65) Prior Publication Data
US 2018/0143417 A1    May 24, 2018

(51) Int. Cl.
*G02B 21/04*    (2006.01)
*G02B 7/198*    (2006.01)
(Continued)

(52) U.S. Cl.
CPC .............. *G02B 21/04* (2013.01); *G02B 7/182* (2013.01); *G02B 7/1822* (2013.01); *G02B 7/198* (2013.01);
(Continued)

(58) Field of Classification Search
CPC ................................ G02B 21/04; G02B 7/198
(Continued)

(56) References Cited

U.S. PATENT DOCUMENTS

| 5,760,979 A * | 6/1998 | Saito ...................... G02B 7/183 |
| | | 359/366 |
| 2002/0034000 A1* | 3/2002 | Hoult ..................... G02B 21/04 |
| | | 359/350 |
| 2013/0242078 A1 | 9/2013 | Maji et al. |

FOREIGN PATENT DOCUMENTS

| JP | H11-305204 A | 11/1999 |
| JP | 2006-047780 A | 2/2006 |

(Continued)

OTHER PUBLICATIONS

International Search Report dated Sep. 15, 2015 of corresponding International application No. PCT/JP2015/066816; 5 pgs.
(Continued)

*Primary Examiner* — Collin X Beatty
(74) *Attorney, Agent, or Firm* — Maier & Maier, PLLC

(57) ABSTRACT

This Cassegrain reflector 200 is provided with a primary mirror 201 and a secondary mirror 202 disposed coaxially with the primary mirror 201 and laterally supported by a plurality of supporting rods. The Cassegrain reflector 200 causes the light incident through an opening 212 formed along an axial line L of the primary mirror 201 to be reflected onto the secondary mirror 202, and then causes the light to be reflected onto the primary mirror 201 in order to emit the light toward a measurement position through an opening 231 formed on the side of the secondary mirror 202. A Cassegrain reflector retention mechanism 6 for retaining the Cassegrain reflector 200 is provided with a retainer 61 for retaining the Cassegrain reflector 200, and a rotation adjustment mechanism 60 for adjusting the rotational position of the plurality of supporting rods.

8 Claims, 8 Drawing Sheets

(51) Int. Cl.
 *G02B 7/182* (2006.01)
 *G02B 21/06* (2006.01)
 *G02B 17/06* (2006.01)
 *G02B 21/08* (2006.01)

(52) U.S. Cl.
 CPC .......... *G02B 17/061* (2013.01); *G02B 21/06* (2013.01); *G02B 21/08* (2013.01)

(58) Field of Classification Search
 USPC .................................................. 359/385, 859
 See application file for complete search history.

(56) References Cited

FOREIGN PATENT DOCUMENTS

| | | |
|---|---|---|
| JP | 2009-210765 A | 9/2009 |
| JP | 2009-271482 A | 11/2009 |
| JP | 2012-077501 A | 4/2012 |
| JP | 2013-190554 A | 9/2013 |
| KR | 10-1040981 B1 | 6/2011 |
| WO | 2012/166461 A1 | 12/2012 |

OTHER PUBLICATIONS

Extended European Search Report dated Jan. 24, 2019, including the Supplementary European Search Report and the European Search Opinion, in connection with corresponding EP Application No. 15894947.9 (7 pgs.).

D.W. Schiering, et al., "An FTIR microscope", American Laboratory, International Scientific Communications, Inc., US, Nov. 1, 1990, pp. 26, 29-31, 33-36, 38, and 40 (10 pgs. total).

* cited by examiner

CASSEGRAIN REFLECTOR RETENTION MECHANISM, MICROSCOPE EQUIPPED WITH SAME, AND METHOD FOR ATTACHING CASSEGRAIN REFLECTOR

FIELD

The present invention relates to a Cassegrain reflector retention mechanism for retaining a Cassegrain reflector including a primary mirror and a secondary mirror disposed coaxially with the primary mirror and laterally supported by a plurality of supporting rods, a microscope including the same, and a method for attaching a Cassegrain reflector.

BACKGROUND

For example, in an infrared microscope, infrared light or visible light can be selectively irradiated to a sample. Since common optical components are used in at least a part of an optical system for irradiating the infrared light to the sample and an optical system for irradiating the visible light to the sample, the number of components is decreased (for example, see Patent Document 1 below).

It is considered to use an objective lens (transmission element) used in a biological microscope as part of the optical system. However, since the objective lens is normally corrected for aberration in a visible region, there is a problem that the influence of chromatic aberration increases and the imaging performance deteriorates when the objective lens is used in an infrared region. Also, since absorption occurs in the infrared region due to a glass material of the lens, the transmittance is greatly decreased and the usable wavelength range is extremely limited.

For such a reason, in a general infrared microscope, a reflection optical system in which light reflected by an optical member is irradiated to a sample is used instead of a transmission optical system in which light transmitted through an optical member is irradiated to a sample. In the case of using such a reflection optical system, a problem of chromatic aberration does not arise differently from the case of using the transmission optical system. Further, since the reflectance of not only the visible region but also the infrared region is high in an aluminum vapor deposition mirror usually used in the reflection optical system, it is possible to use the infrared microscope in a wide wavelength region from the visible region to the infrared region.

As optical components included in the reflection optical system, for example, a Cassegrain reflector including a primary mirror and a secondary mirror which are coaxially disposed is used. The Cassegrain reflector is a so-called Schwarzschild reflection objective mirror and has an optical arrangement which is very similar to a Cassegrain astronomical telescope.

Further, in the infrared microscope capable of performing the transmission measurement, Cassegrain reflectors having the same specifications (magnification, numeral aperture NA, etc.) as imaging objective mirrors are often used in combination as condenser mirrors for collecting infrared light and irradiating the light to a sample. In this case, for example, a pair of Cassegrain reflectors are disposed above and below the sample. The pair of Cassegrain reflectors includes a Cassegrain reflector (a lower Cassegrain reflector) which focuses the infrared light to the sample from below and a Cassegrain reflector (an upper Cassegrain reflector) which images transmitted light directed upward from the sample.

FIG. 1 is a schematic cross-sectional view illustrating an example of an internal configuration of a Cassegrain reflector 200. Further, FIG. 2 is a schematic plan view illustrating an example of an external configuration of the Cassegrain reflector 200. FIG. 2 is a diagram illustrating the Cassegrain reflector 200 when viewed from the direction of an arrow A in FIG. 1.

The Cassegrain reflector 200 is provided with, for example, a primary mirror 201 and a secondary mirror 202. The primary mirror 201 includes a reflection surface 211 formed as a spherical concave surface. Meanwhile, the secondary mirror 202 includes a reflection surface 221 formed as a spherical convex surface. The reflection surface 221 of the secondary mirror 202 has a diameter smaller than the reflection surface 211 of the primary mirror 201.

The primary mirror 201 and the secondary mirror 202 are retained by a hollow casing 203. The primary mirror 201 and the secondary mirror 202 are attached to the casing 203 so that the centers of the reflection surfaces 211 and 221 are located on the same axial line L. More specifically, the reflection surface 221 of the secondary mirror 202 faces the reflection surface 211 of the primary mirror 201 while being separated therefrom.

A surface facing the reflection surface 211 of the primary mirror 201 in the casing 203 is provided with, for example, a circular opening 231. As illustrated in FIG. 2, the secondary mirror 202 is supported by a plurality of supporting rods 232, radially extending from the circumferential edge of the opening 231 toward the axial line L, from the lateral side (the outside in the radial direction) to be located at the center portion of the opening 231. Accordingly, the opening 231 is defined into a plurality of regions by the supporting rods 232 at the side of the secondary mirror 202.

As illustrated in FIG. 1, the primary mirror 201 is provided with an opening 212 on the axial line L. The infrared light or the visible light is incident from the opening 212, is reflected by the reflection surface 221 of the secondary mirror 202, and is reflected by the reflection surface 211 of the primary mirror 201. At this time, a part of the light reflected by the reflection surface 211 of the primary mirror 201 is shielded by the secondary mirror 202, but the other light is emitted from the side of the secondary mirror 202 through the opening 231. The light emitted from the opening 231 is focused to a measurement position P at the outside of the casing 203.

SUMMARY OF THE DISCLOSURE

As described above, in the Cassegrain reflector 200, the light flux in the vicinity of the axial line L of the incident light flux is shielded (obscured) by the secondary mirror 202. For that reason, the Cassegrain reflector 200 has a characteristic that the light amount loss is larger than the objective lens in which the incident light flux substantially becomes the emitted light flux from the viewpoint of the ratio (throughput) between the incident light amount and the emitted light amount.

The shielding ratio which is the optical design specification for the shielding of the Cassegrain reflector 200 is calculated by using a maximum numerical aperture $NA_{max}$ of the primary mirror 201 and a numerical aperture $NA_{min}$ shielded by the secondary mirror 202. Specifically, the shielding ratio is expressed by $NA_{min}/NA_{max} \times 100(\%)$. When designing the Cassegrain reflector 200, the shielding ratio is designed to be as small as possible, but in the case of the large Cassegrain reflector 200, the shielding ratio exceeds 40%. Accordingly, it may be very disadvantageous in terms of throughput as compared with the objective lens.

Further, a part of the light emitted from the side of the secondary mirror 202 through the opening 231 is shielded by the plurality of supporting rods 232 located inside the opening 231. In general, two to four supporting rods 232 are used, but since the total area shielding the light flux increases as the number of the supporting rods 232 increases and the thickness of the supporting rod 232 increases, a problem arises in that the influence of the light amount loss increases.

Particularly, since the pair of Cassegrain reflectors 200 is disposed above and below the sample in the case of performing the transmission measurement by the infrared microscope, the light flux is shielded by the supporting rod 232 when the light flux passes through the Cassegrain reflectors 200. For that reason, when the light flux shielding positions in the Cassegrain reflectors 200 do not overlap, the influence of the light amount loss due to the supporting rods 232 is doubled as compared with the case of the reflection measurement performed by one Cassegrain reflector 200, thereby causing a decrease in throughput.

The invention has been made in view of the above-described circumstances and an object of the invention is to provide a Cassegrain reflector retention mechanism capable of suppressing a light shield state caused by a plurality of supporting rods supporting a secondary mirror as small as possible, a microscope including the same, and a method for attaching a Cassegrain reflector.

(1) A Cassegrain reflector retention mechanism according to the invention is a Cassegrain reflector retention mechanism for retaining a Cassegrain reflector that includes a primary mirror and a secondary mirror disposed coaxially with the primary mirror and laterally supported by a plurality of supporting rods and is used to reflect light incident from an opening formed on an axial line of the primary mirror by the secondary mirror, reflect the light by the primary mirror, and emit the light to a measurement position from a side of the secondary mirror. The Cassegrain reflector retention mechanism includes: a retainer that retains the Cassegrain reflector; and a rotation adjustment mechanism that adjusts rotational positions of the plurality of supporting rods of the Cassegrain reflector retained by the retainer about the axial line.

According to such a configuration, the rotational positions of the plurality of supporting rods supporting the secondary mirror with respect to the axial line can be adjusted by the rotation adjustment mechanism. Thus, when the rotational positions are appropriately adjusted, a light shield state caused by the plurality of supporting rods can be suppressed as small as possible.

For example, in the case of a configuration in which a pair of Cassegrain reflectors are coaxially disposed and light emitted from one Cassegrain reflector is incident to the other Cassegrain reflector as in the case of the transmission measurement, the plurality of supporting rods of at least one of the pair of Cassegrain reflectors are rotated. At this time, when the rotational positions are adjusted so that the plurality of supporting rods of the pair of Cassegrain reflectors overlap one another when viewed along the axial line, a light shield state caused by the plurality of supporting rods can be suppressed as small as possible.

Further, in the case of a configuration in which one Cassegrain reflector is used, light incident to the Cassegrain reflector is reflected by the first region of the secondary mirror, is reflected by the primary mirror, and is emitted to the measurement position from the side of the secondary mirror and light reflected from the sample at the measurement position is reflected by the primary mirror and is reflected by the second region of the secondary mirror to emit the light as in the case of the reflection measurement, the plurality of supporting rods of the Cassegrain reflector are rotated. At this time, when the rotational positions are adjusted so that the plurality of supporting rods become line-symmetrical when viewed along the axial line with respect to the boundary line between the first region and the second region of the secondary mirror, a light shield state caused by the plurality of supporting rods can be suppressed as small as possible.

(2) The rotation adjustment mechanism may include a fixing part that fixes the rotational positions of the plurality of supporting rods of the Cassegrain reflector.

According to such a configuration, the rotational positions of the plurality of supporting rods can be fixed by the fixing part after the rotational positions of the plurality of supporting rods are adjusted by the rotation adjustment mechanism with respect to the axial line. Accordingly, since a deviation of the rotational positions of the plurality of supporting rods can be prevented, a light shield state caused by the plurality of supporting rods can be reliably suppressed as small as possible.

(3) The Cassegrain reflector may be attachable to or detachable from the retainer along with the rotation adjustment mechanism.

According to such a configuration, an arbitrary Cassegrain reflector among the Cassegrain reflectors can be selectively attached to the retainer. At this time, since the Cassegrain reflector can be attached or detached along with the rotation adjustment mechanism, the rotational positions of the plurality of supporting rods adjusted once by the relation with the Cassegrain reflectors can be maintained.

(4) The retainer may include a positioning part that prevents the Cassegrain reflector from rotating along with the rotation adjustment mechanism.

According to such a configuration, since the rotational positions of the Cassegrain reflector and the rotation adjustment mechanism are determined by the positioning part, the rotational positions can be uniformly maintained even when the Cassegrain reflector and the rotation adjustment mechanism are attached to or detached from the retainer. Thus, when the rotational positions of the plurality of supporting rods are adjusted once by the relation with the Cassegrain reflector, there is no need to adjust the rotational positions even when the Cassegrain reflector is attached to or detached from the retainer along with the rotation adjustment mechanism later.

(5) A microscope according to the invention includes: the Cassegrain reflector retention mechanism; a Cassegrain reflector that is retained by the Cassegrain reflector retention mechanism; a light source that irradiates light to a sample through the Cassegrain reflector; and a detector that receives reflected light or transmitted light from a sample at the measurement position.

(6) A method for attaching a Cassegrain reflector according to the invention includes: an installation step of coaxially installing a pair of the Cassegrain reflectors with the measurement position interposed therebetween; and an adjustment step of adjusting rotational positions so that the plurality of supporting rods of the pair of Cassegrain reflectors overlap each other when viewed along the axial line by rotating the plurality of supporting rods of at least one of the pair of Cassegrain reflectors about the axial line.

(7) Another method for attaching a Cassegrain reflector according to the invention includes: an installation step of installing the Cassegrain reflector to face the measurement position; and an adjustment step of adjusting rotational positions so that the plurality of supporting rods become line-symmetrical when viewed along the axial line with respect to a boundary line between the first region and the second region of the secondary mirror by rotating the plurality of supporting rods of the Cassegrain reflector about the axial line.

According to the invention, since the rotational positions of the plurality of supporting rods supporting the secondary mirror about the axial line can be adjusted by the rotation adjustment mechanism, a light shield state caused by the plurality of supporting rods can be suppressed as small as possible when the rotational positions are appropriately adjusted.

DETAILED DESCRIPTION OF THE DRAWINGS

1. Configuration of Microscope

Figure 2:
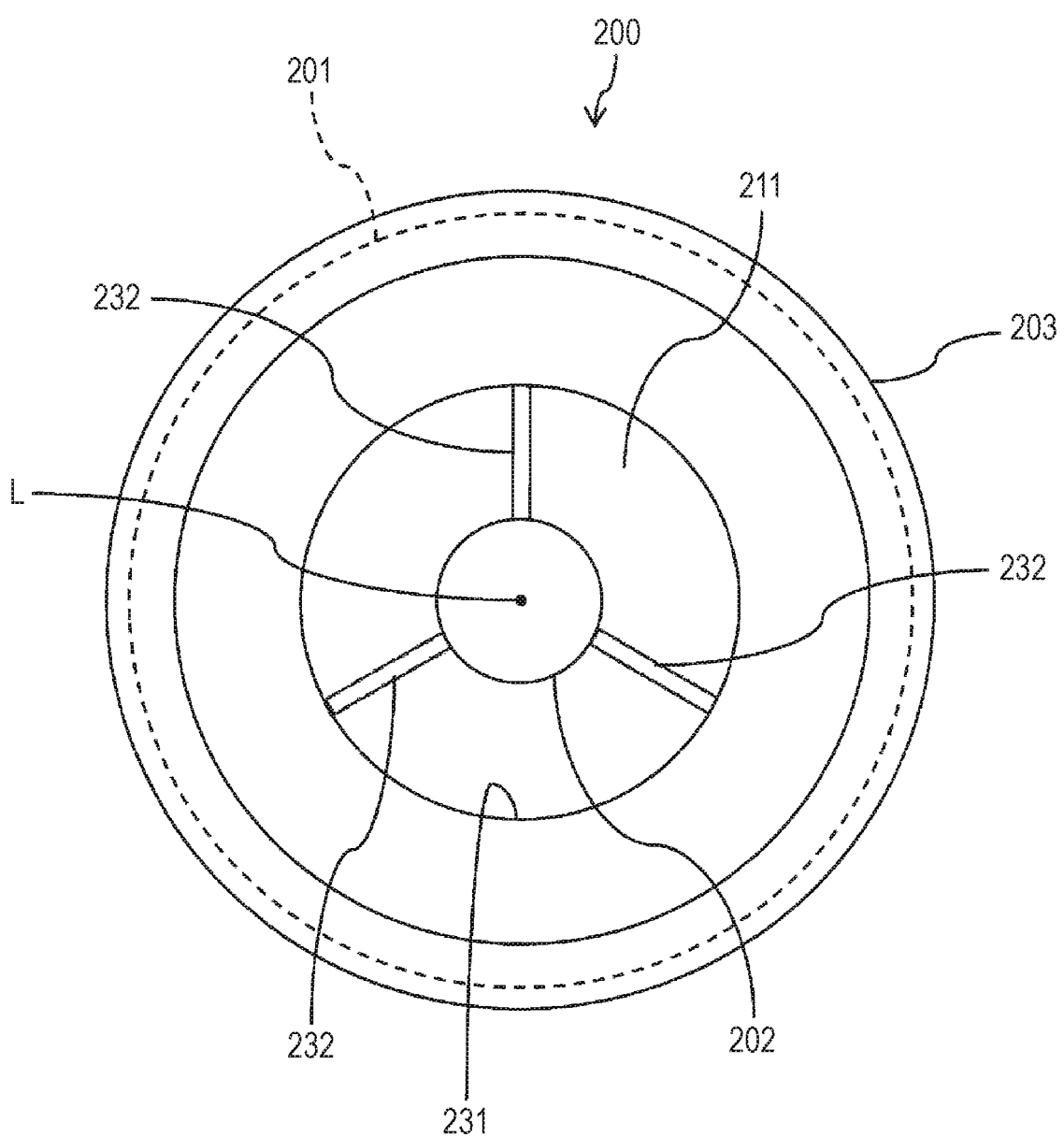
FIG. 2 is a schematic plan view illustrating an example of an external configuration of the Cassegrain reflector.
Figure 3:
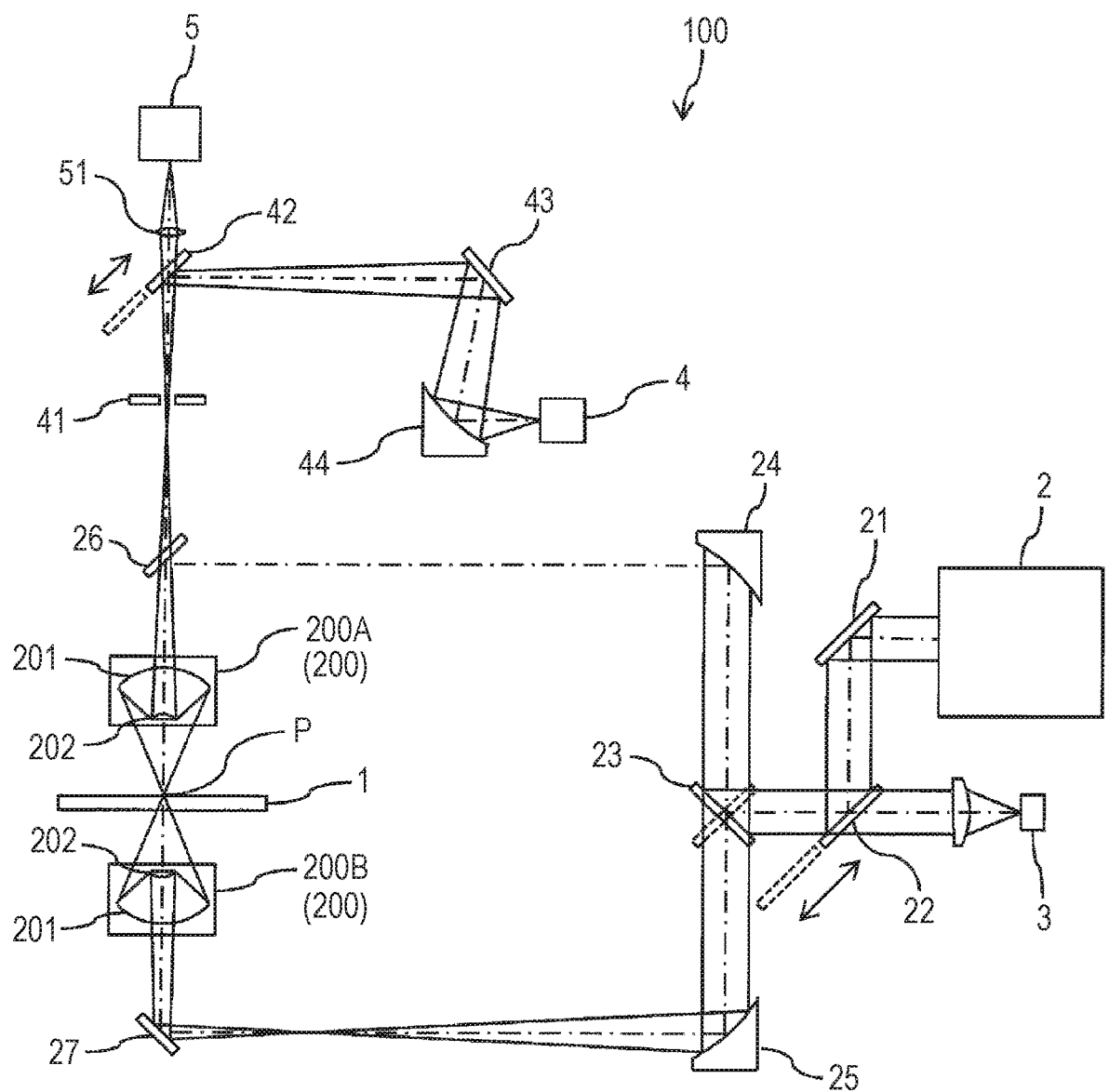
FIG. 3 is a schematic diagram illustrating a configuration example of a microscope according to an embodiment of the invention.

FIG. 3 is a schematic diagram illustrating a configuration example of a microscope 100 according to an embodiment of the invention. This microscope 100 is, for example, an infrared microscope capable of selectively irradiating infrared light or visible light to a sample. The microscope 100 is provided with a sample stage 1, an infrared light source 2, a visible light source 3, a detector 4, and a camera 5 other than a Cassegrain reflector 200 illustrated in FIGS. 1 and 2.

A sample which is an analysis target is placed on the sample stage 1. The sample stage 1 is configured to be movable in, for example, a horizontal direction (an XY direction) and a vertical direction (a Z direction). In this embodiment, a pair of the Cassegrain reflectors 200 is installed at the upper and lower sides with the sample stage 1 interposed therebetween.

Although the Cassegrain reflector 200 (an upper Cassegrain reflector 200A) installed above the sample stage and the Cassegrain reflector 200 (a lower Cassegrain reflector 200B) installed below the sample stage 1 respectively have the same configuration, the installation directions are different from each other. Specifically, the upper Cassegrain reflector 200A is disposed so that a secondary mirror 202 is located below a primary mirror 201 and the lower Cassegrain reflector 200B is disposed so that a secondary mirror 202 is located above a primary mirror 201. The upper Cassegrain reflector 200A and the lower Cassegrain reflector 200B are coaxially disposed so that their axial lines L respectively extend in the vertical direction.

The infrared light source 2 emits infrared light and irradiates the infrared light onto the sample stage 1 through the Cassegrain reflector 200. In the case of the reflection measurement, the light emitted from the infrared light source 2 is sequentially reflected by reflection mirrors 21, 22, and 23, is sequentially reflected by a concave mirror 24 and a half mirror 26, and is introduced into the upper Cassegrain reflector 200A from above. Meanwhile, in the case of the transmission measurement, when the angle of the reflection mirror 23 is changed, the light emitted from the infrared light source 2 is sequentially reflected by the reflection mirrors 21, 22, and 23, is sequentially reflected by a concave mirror 25 and a reflection mirror 27, and is introduced into the lower Cassegrain reflector 200B from below.

The visible light source 3 emits visible light so that the visible light is irradiated onto the sample stage 1 through the Cassegrain reflector 200. The visible light emitted from the visible light source 3 is guided to the Cassegrain reflector 200 while passing through an optical path which is mostly in common with an optical path of the infrared light. The reflection mirror 22 is configured to advance or retreat with respect to the optical paths of the infrared light and the visible light and the reflection mirror 22 retreats from the optical path when the visible light is emitted from the visible light source 3. Similarly to the infrared light emitted from the infrared light source 2, the visible light emitted from the visible light source 3 can be introduced into the upper Cassegrain reflector 200A from above through the reflection mirror 23, the concave mirror 24, and the half mirror 26 and can be introduced into the lower Cassegrain reflector 200B from below through the reflection mirror 23, the concave mirror 25, and the reflection mirror 27.

At the time of performing the reflection measurement, the infrared light introduced from an opening 212 near the primary mirror 201 inside the upper Cassegrain reflector 200A is sequentially reflected by the secondary mirror 202 and the primary mirror 201 and is focused to a measurement position P on the sample stage 1 from above through an opening 231 near the secondary mirror 202. At this time, the light being incident to the Cassegrain reflector 200 (the upper Cassegrain reflector 200A) is reflected by a first region R1 of the secondary mirror 202, is reflected by the primary mirror 201, and is emitted to the measurement position P from the side of the secondary mirror 202 (see FIG. 1).

Figure 1:
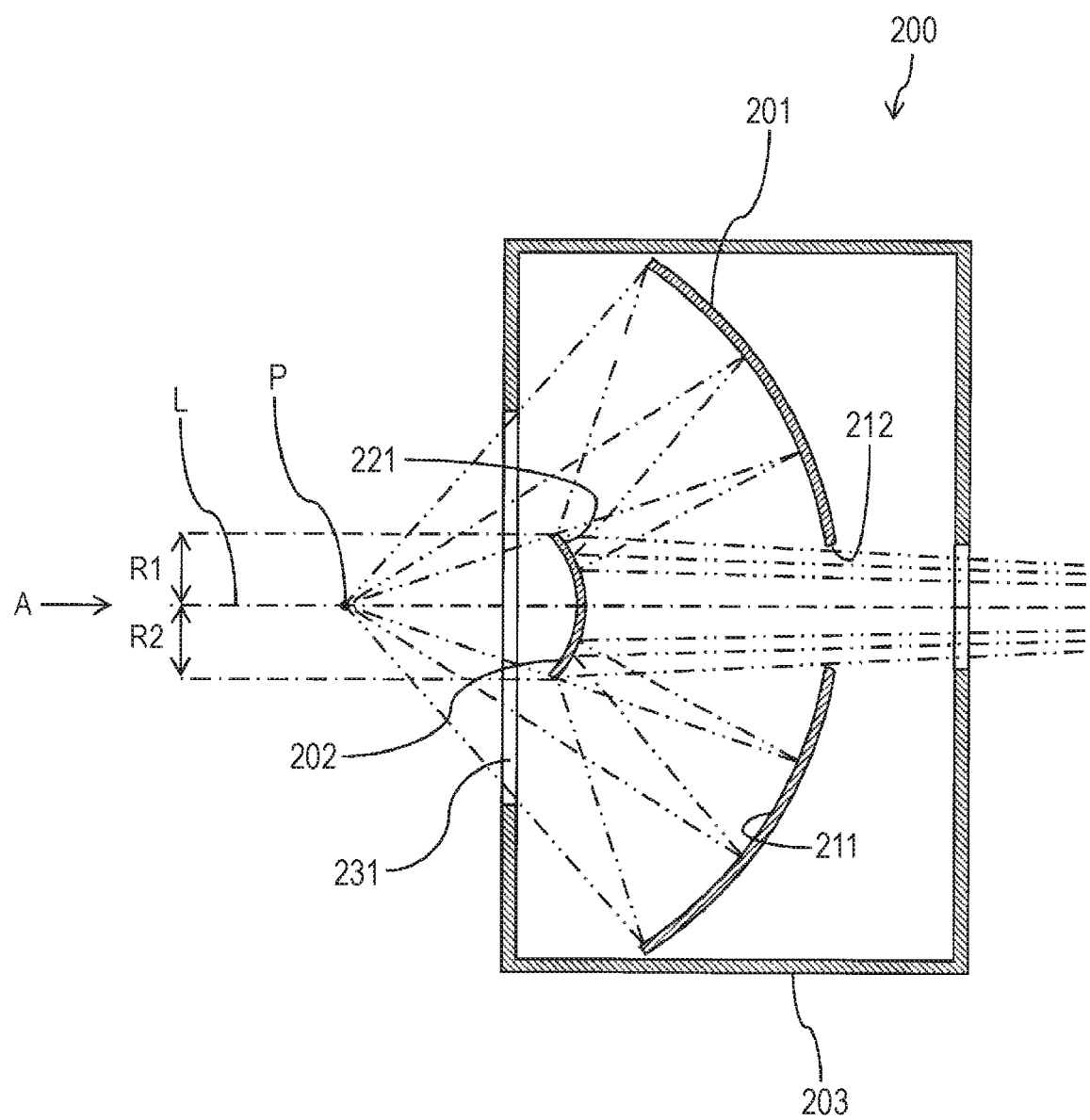
FIG. 1 is a schematic cross-sectional view illustrating an example of an internal configuration of a Cassegrain reflector.

The light reflected from the sample placed on the measurement position P is incident into the upper Cassegrain reflector 200A again through the opening 231 near the secondary mirror 202, is sequentially reflected by the primary mirror 201 and the secondary mirror 202, and is emitted from the opening 212 near the primary mirror 201. At this time, the light reflected from the sample at the measurement position P is reflected by the primary mirror 201 and is reflected by a second region R2 of the secondary mirror 202 to emit the light (see FIG. 1). As illustrated in FIG. 1, the first region R1 and the second region R2 are located so as not to overlap each other with the axial line L interposed therebetween.

The light emitted from the opening 212 of the upper Cassegrain reflector 200A is transmitted through the half mirror 26. Then, the light transmitted through the half mirror 26 passes through a slit 41, is sequentially reflected by reflection mirrors 42 and 43 and a collector mirror 44, and is received by the detector 4. Accordingly, since a detection signal is output from the detector 4, the reflection measurement of the sample can be performed on the basis of the detection signal.

Meanwhile, in the case of performing the transmission measurement, the infrared light introduced into the lower Cassegrain reflector 200B from the opening 212 near the primary mirror 201 is sequentially reflected by the secondary mirror 202 and the primary mirror 201 and is focused to the measurement position P on the sample stage 1 from below through the opening 231 near the secondary mirror 202. At this time, the light being incident to the Cassegrain reflector 200 (the lower Cassegrain reflector 200B) is reflected by the entire region (the first region R1 and the second region R2) of the secondary mirror 202, is reflected by the primary mirror 201, and is emitted to the measurement position P from the side of the secondary mirror 202 (see FIG. 1). Then, the light transmitted through the sample placed on the measurement position P is incident into the upper Cassegrain reflector 200A through the opening 231 near the secondary mirror 202.

The light being incident into the upper Cassegrain reflector 200A is sequentially reflected by the primary mirror 201 and the secondary mirror 202 and is emitted from the opening 212 near the primary mirror 201. At this time, the light reflected by the primary mirror 201 is reflected by the entire region (the first region R1 and the second region R2) of the secondary mirror 202 and is emitted from the opening 212 near the primary mirror 201 (see FIG. 1).

The light emitted from the opening 212 of the upper Cassegrain reflector 200A is transmitted through the half mirror 26. Then, the light transmitted through the half mirror 26 passes through the slit 41, is sequentially reflected by the reflection mirrors 42 and 43 and the collector mirror 44, and is received by the detector 4. Accordingly, since a detection signal is output from the detector 4, the transmission measurement of the sample can be performed on the basis of the detection signal.

When the visible light is irradiated from the visible light source 3 to the measurement position P on the sample stage 1, the visible light from the measurement position P is incident into the upper Cassegrain reflector 200A through the opening 231 near the secondary mirror 202. Then, the visible light being incident into the upper Cassegrain reflector 200A is sequentially reflected by the primary mirror 201 and the secondary mirror 202, is emitted from the opening 212 near the primary mirror 201, and is transmitted through the half mirror 26.

The reflection mirror 42 is configured to advance or retreat with respect to the optical paths of the infrared light and the visible light and the reflection mirror 42 retreats from the optical path when the visible light is emitted from the visible light source 3. The visible light transmitted through the half mirror 26 passes through the slit 41, is focused by a lens 51, and is incident to the camera 5. Accordingly, an image illuminated by the visible light can be photographed by the camera 5 and the image can be checked.

2. Configuration of Cassegrain Reflector Retention Mechanism

Figure 4:
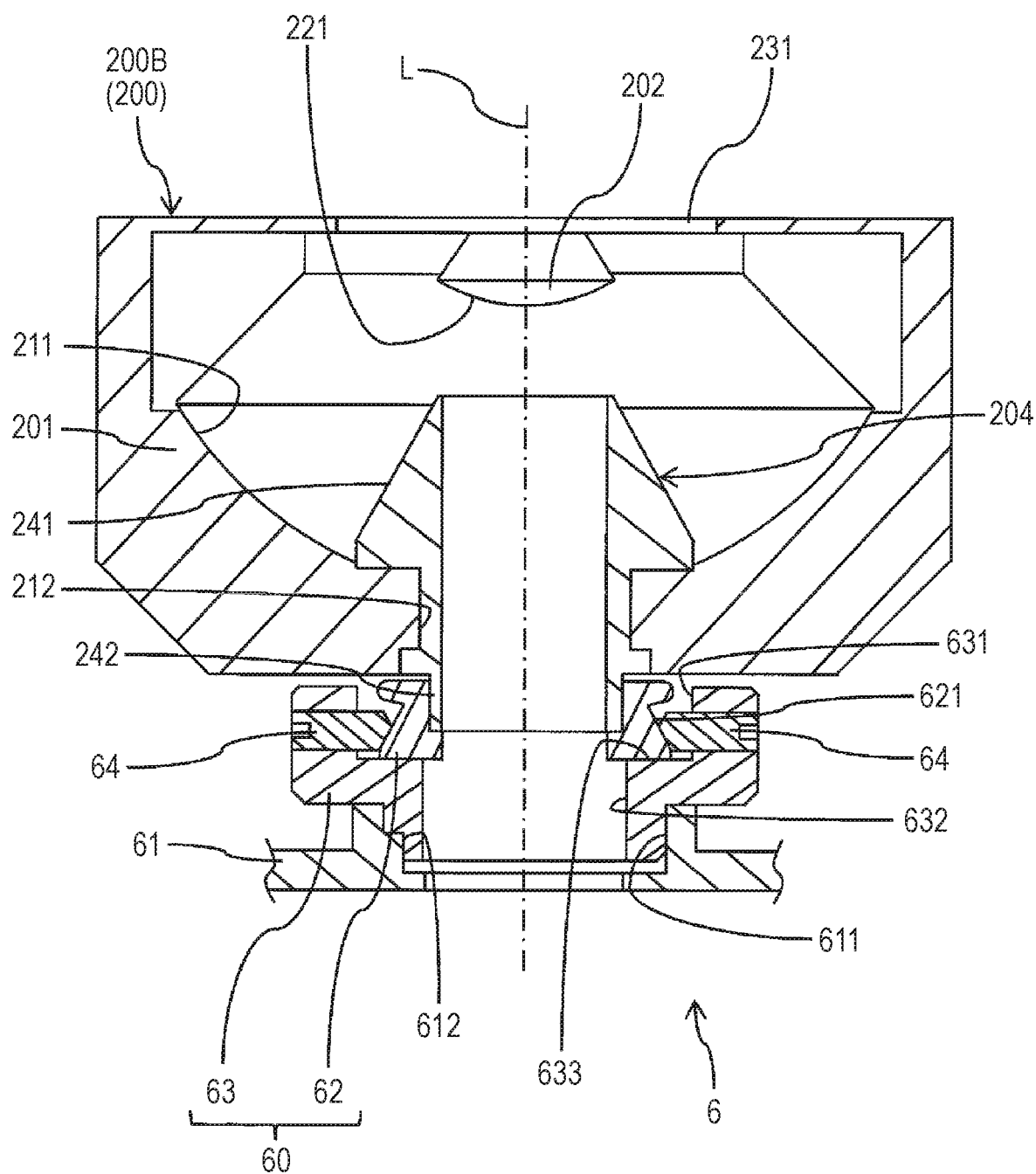
FIG. 4 is a cross-sectional view illustrating a configuration example of a Cassegrain reflector retention mechanism that retains a lower Cassegrain reflector.

FIG. 4 is a cross-sectional view illustrating a configuration example of a Cassegrain reflector retention mechanism 6 retaining the lower Cassegrain reflector 200B. This Cassegrain reflector retention mechanism 6 includes a retainer 61 which retains the lower Cassegrain reflector 200B. The retainer 61 retains the lower Cassegrain reflector 200B from below in a posture in which the secondary mirror 202 is located above the primary mirror 201.

In this example, a cylindrical member 204 is attached to the opening 212 near the primary mirror 201 in the lower Cassegrain reflector 200B. The cylindrical member 204 extends in the axial line L and is fixed while being inserted through the opening 212. An upper end of the cylindrical member 204 is formed so that an outer circumferential surface thereof becomes a conical surface 241. This conical surface 241 is located between the primary mirror 201 and the secondary mirror 202 inside the lower Cassegrain reflector 200B. Accordingly, unnecessary multiple reflected light and scattered light can be cut.

A lower end of the cylindrical member 204 protrudes toward the outside of the lower Cassegrain reflector 200B and an outer circumferential surface thereof is provided with a threaded part 242. The threaded part 242 is formed as a compatible screw mount called an RMS mount (JIS standard M20.32 (P0.706)). This threaded part 242 is threaded into a cylindrical nut part 62. Since the nut part 62 is strongly fastened to the threaded part 242, the nut part cannot be easily rotated.

An attachment member 63 is attached to the outside of the nut part 62 in the radial direction. The attachment member 63 is a cylindrical member and an inner surface thereof is provided with a first inner circumferential surface 631 having an inner diameter larger than an outer diameter of the nut part 62 and a second inner circumferential surface 632 having an inner diameter smaller than the outer diameter of the nut part 62. The first inner circumferential surface 631 and the second inner circumferential surface 632 are connected to each other by an annular stepped surface 633.

The nut part 62 is disposed at the inside of the first inner circumferential surface 631 inside the attachment member 63 and a lower end surface thereof comes into contact with the stepped surface 633. Accordingly, the nut part 62 is rotatable on the stepped surface 633 inside the attachment member 63. Thus, the lower Cassegrain reflector 200B is rotatable about the axial line L with respect to the attachment member 63 along with the nut part 62.

A plurality of fixing nuts 64 are attached to an upper end of the attachment member 63 so as to penetrate the first inner circumferential surface 631. When the threaded amount of these fixing nuts 64 with respect to the attachment member 63 is adjusted, a protrusion amount from the first inner circumferential surface 631 is changed. Thus, when each fixing nut 64 is threaded into the attachment member 63, a front end of each fixing nut 64 comes into contact with an outer circumferential surface of the nut part 62 so that the rotational position of the nut part 62 with respect to the axial line L can be fixed.

The outer circumferential surface of the nut part 62 is provided with a tapered surface 621 and the front end of each fixing nut 64 is threaded into the tapered surface 621 to be bitten therein. Accordingly, since each fixing nut 64 is strongly fixed to the nut part 62, it is possible to prevent the nut part 62 from rotating about the axial line L with respect to the attachment member 63.

A lower end of the attachment member 63 is received inside a recessed part 611 formed on an upper surface of the retainer 61. A positioning protrusion 612 is formed to protrude into the recessed part 611 of the retainer 61 and the rotation of the attachment member 63 about the axial line L on the retainer 61 can be prevented when the positioning protrusion 612 is locked to the lower end of the attachment member 63.

In this way, the lower Cassegrain reflector 200B is retained on the retainer 61 along with the nut part 62 and the attachment member 63 and the lower Cassegrain reflector 200B can be rotated about the axial line L along with the nut part 62 while each fixing nut 64 is not fixed to the nut part 62. When the lower Cassegrain reflector 200B is rotated about the axial line L, a plurality of supporting rods 232 (see FIG. 2) provided in the lower Cassegrain reflector 200B also rotate about the axial line L.

Thus, the nut part 62 and the attachment member 63 constitute a rotation adjustment mechanism 60 which adjusts the rotational positions of the plurality of supporting rods 232 of the lower Cassegrain reflector 200B retained by the retainer 61 about the axial line L. Further, the fixing nuts 64 constitute a fixing part which fixes the rotational positions of the plurality of supporting rods 232 of the lower Cassegrain reflector 200B and the fixing part is included in the rotation adjustment mechanism 60.

The lower Cassegrain reflector 200B is attachable to or detachable from the retainer 61 along with the rotation adjustment mechanism 60. Then, in a state where the lower Cassegrain reflector 200B is attached to the retainer 61 along with the rotation adjustment mechanism 60, the positioning protrusion 612 serves as a positioning part for preventing the rotation of the lower Cassegrain reflector 200B along with the rotation adjustment mechanism 60.

3. Case of Adjusting Rotational Position

Figure 5A:
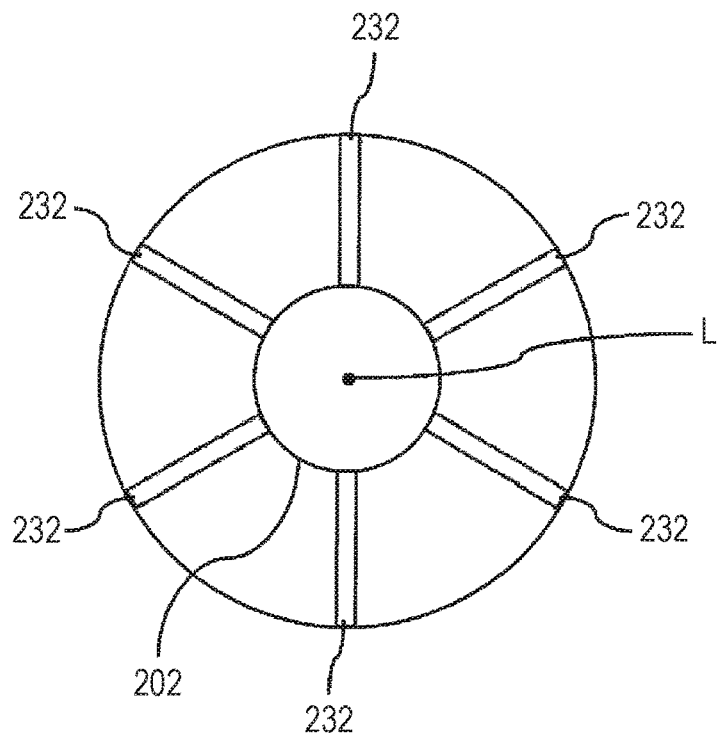
FIG. 5A is a diagram illustrating a case of adjusting rotational positions of a plurality of supporting rods using a rotation adjustment mechanism.
Figure 5B:
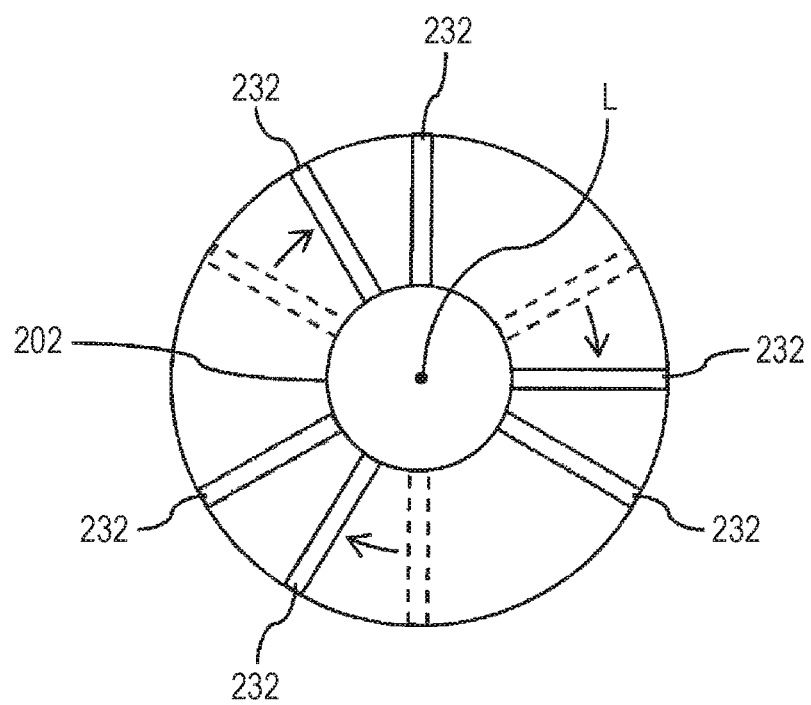
FIG. 5B is a diagram illustrating the case of adjusting the rotational positions of the plurality of supporting rods using the rotation adjustment mechanism.
Figure 5C:
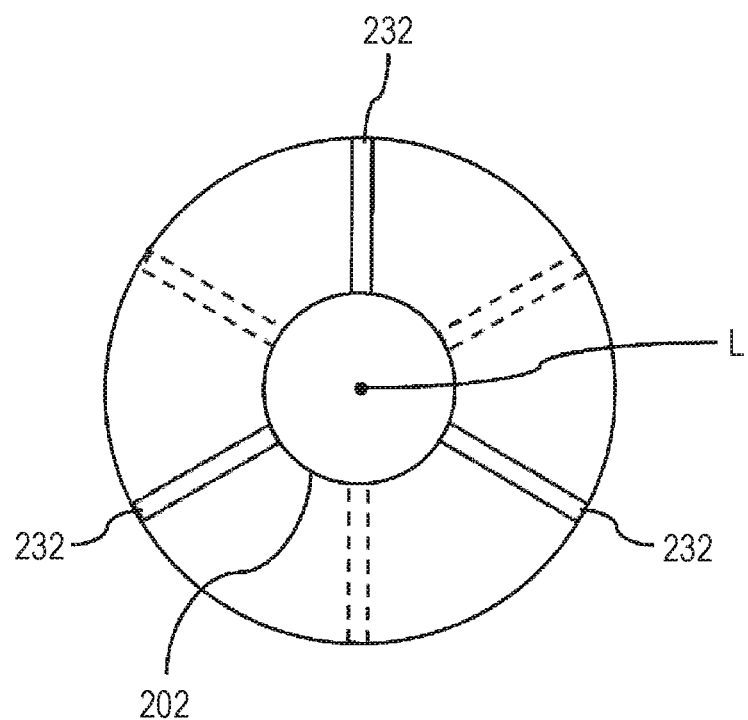
FIG. 5C is a diagram illustrating the case of adjusting the rotational positions of the plurality of supporting rods using the rotation adjustment mechanism.

FIGS. 5A to 5C are diagrams illustrating a case of adjusting the rotational positions of the plurality of supporting rods 232 using the rotation adjustment mechanism 60. FIGS. 5A to 5C are diagrams in which the plurality of (for example, three) supporting rods 232 of the upper Cassegrain reflector 200A and the plurality of (for example, three) supporting rods 232 of the lower Cassegrain reflector 200B are viewed along the axial line L.

In this embodiment, in each of the upper Cassegrain reflector 200A and the lower Cassegrain reflector 200B, three supporting rods 232 are provided at the interval of 120° about the axial line L. In this case, when the rotational position of the supporting rod 232 of the upper Cassegrain reflector 200A and the rotational position of the supporting rod 232 of the lower Cassegrain reflector 200B are deviated from each other by 180°, six supporting rods 232 are located on the optical path so as not to overlap one another as illustrated in FIG. 5A when these supporting rods 232 are viewed along the axial line L.

In this case, when the lower Cassegrain reflector 200B is rotated by the rotation adjustment mechanism 60 with respect to the retainer 61, the rotational position of the supporting rod 232 of the lower Cassegrain reflector 200B can approach the rotational position of the supporting rod 232 of the upper Cassegrain reflector 200A as illustrated in FIG. 5B. Then, when the rotational positions are adjusted so that the supporting rod 232 of the lower Cassegrain reflector 200B overlaps the supporting rod 232 of the upper Cassegrain reflector 200A as illustrated in FIG. 5C, the number of the supporting rods 232 located on the optical path can be suppressed as small as possible.

Figure 6:
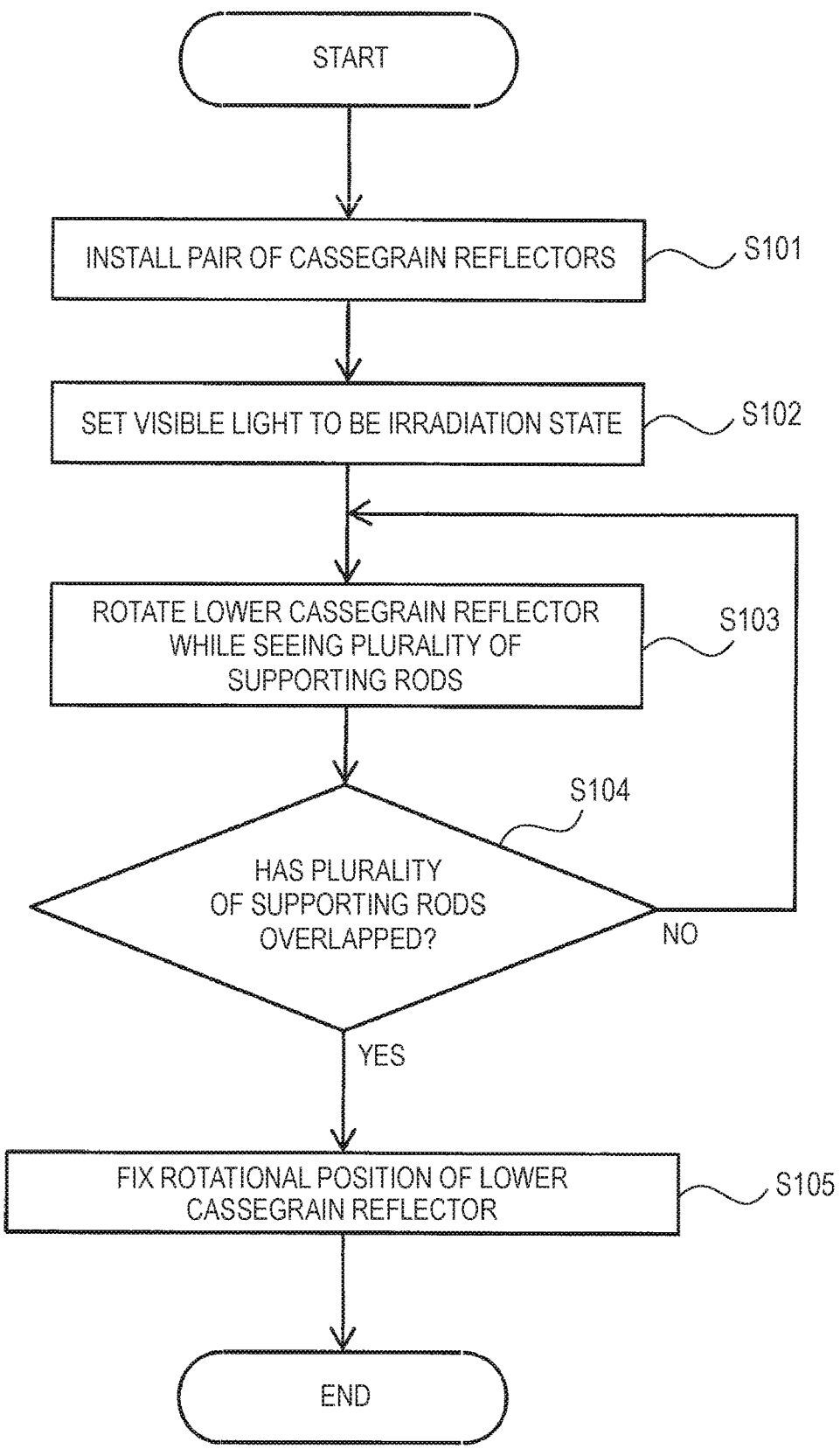
FIG. 6 is a flowchart illustrating an example of a method for attaching a Cassegrain reflector in the case of performing transmission measurement.

FIG. 6 is a flowchart illustrating an example of a method for attaching the Cassegrain reflector 200 in the case of performing the transmission measurement. Since the pair of Cassegrain reflectors 200 (the upper Cassegrain reflector 200A and the lower Cassegrain reflector 200B) is necessary in the case of performing the transmission measurement, the pair of Cassegrain reflectors 200 is coaxially provided with the measurement position P (see FIG. 3) interposed therebetween (step S101: an attachment step).

Subsequently, when the visible light is irradiated from the visible light source 3 to the measurement position P (step S102), an operator can see the plurality of supporting rods 232 on the optical path. In this state, an operator rotates the lower Cassegrain reflector 200B about the axial line L by the rotation adjustment mechanism 60 while seeing the plurality of supporting rods 232 by eyes or a camera (not illustrated) (step S103).

At this time, the rotational positions are adjusted (step S103: an adjustment step) until the supporting rod 232 of the upper Cassegrain reflector 200A and the supporting rod 232 of the lower Cassegrain reflector 200B overlap each other when viewed along the axial line L (until Yes in step S104). Then, the rotational position of the lower Cassegrain reflector 200B is fixed when the fixing nuts 64 are threaded into the attachment member 63 (step S105) while the supporting rod 232 of the upper Cassegrain reflector 200A overlaps the supporting rod 232 of the lower Cassegrain reflector 200B as illustrated in FIG. 5C (Yes in step S104).

4. Operation and Effect (1) In this embodiment, the rotational positions of the plurality of supporting rods 232 supporting the secondary mirror 202 can be adjusted by the rotation adjustment mechanism 60 with respect to the axial line L. Thus, when the rotational positions are appropriately adjusted, a light shield state caused by the plurality of supporting rods 232 can be suppressed as small as possible.

As in the case of the transmission measurement illustrated in FIG. 6, in the case of a configuration in which the pair of Cassegrain reflectors 200 (the upper Cassegrain reflector 200A and the lower Cassegrain reflector 200B) is coaxially disposed and the light emitted from the lower Cassegrain reflector 200B is incident to the upper Cassegrain reflector 200A, for example, the plurality of supporting rods 232 of the lower Cassegrain reflector are rotated. At this time, when the rotational positions are adjusted so that the supporting rod 232 of the upper Cassegrain reflector 200A and the supporting rod 232 of the lower Cassegrain reflector 200B overlap each other when viewed along the axial line L, a light shield state caused by the plurality of supporting rods 232 can be suppressed as small as possible.

(2) In this embodiment, the rotational positions of the plurality of supporting rods 232 can be fixed by the fixing nuts 64 after the rotational positions of the plurality of supporting rods 232 with respect to the axial line L are adjusted by the rotation adjustment mechanism 60. Accordingly, since a deviation of the rotational positions of the plurality of supporting rods 232 can be prevented, a light shield state caused by the plurality of supporting rods 232 can be suppressed as small as possible.

(3) In this embodiment, since the Cassegrain reflector 200 (the lower Cassegrain reflector 200B) can be attached to or detached from the retainer 61, an arbitrary Cassegrain reflector 200 among the plural kinds of Cassegrain reflectors 200 can be selectively attached to the retainer 61. At this time, since the Cassegrain reflector 200 can be attached or detached along with the rotation adjustment mechanism 60, the rotational positions of the plurality of supporting rods 232 adjusted once by the relation with the Cassegrain reflectors 200 can be maintained.

(4) In this embodiment, since the rotational positions of the Cassegrain reflector 200 (the lower Cassegrain reflector 200B) and the rotation adjustment mechanism 60 are determined by the positioning protrusion 612, the rotational positions can be uniformly maintained even when the Cassegrain reflector 200 and the rotation adjustment mechanism 60 are attached to or detached from the retainer 61. Thus, when the rotational positions of the plurality of supporting rods 232 are adjusted once by the relation with the Cassegrain reflector 200, there is no need to adjust the rotational position again even when the Cassegrain reflector 200 is attached to or detached from the retainer 61 along with the rotation adjustment mechanism 60 later.

5. Modified Example

In the above-described embodiment, a configuration of rotating the plurality of supporting rods 232 of the lower Cassegrain reflector 200B when the pair of Cassegrain reflectors 200 (the upper Cassegrain reflector 200A and the lower Cassegrain reflector 200B) is coaxially disposed has been described. However, the invention is not limited to such a configuration and the same configuration such as the rotation adjustment mechanism 60 and the retainer 61 can be also applied to the upper Cassegrain reflector 200A. In this case, the rotational position of only the upper Cassegrain reflector 200A may be adjusted or the rotational positions of both the upper Cassegrain reflector 200A and the lower Cassegrain reflector 200B may be adjusted.

In the above-described embodiment, a case of performing the transmission measurement has been described, but the invention can be also applied to a case where one Cassegrain reflector (the upper Cassegrain reflector 200A) is used as in the case of performing the reflection measurement. In this case, only the upper Cassegrain reflector 200A may be attached to the microscope 100 by omitting the lower Cassegrain reflector 200B or both the upper Cassegrain reflector 200A and the lower Cassegrain reflector 200B may be attached to the microscope 100 so that only the upper Cassegrain reflector 200A is used for the reflection measurement.

Figure 7:
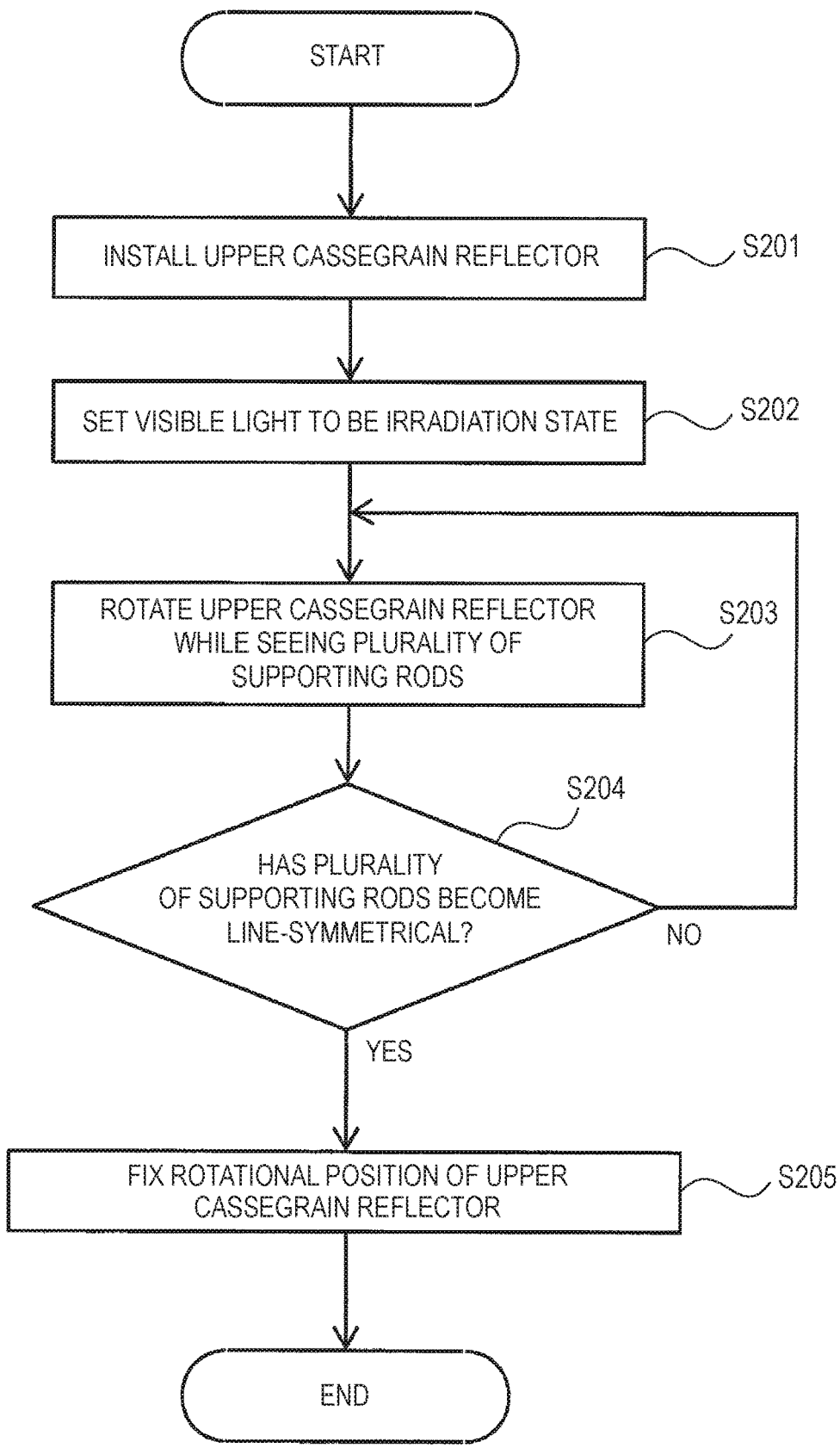
FIG. 7 is a flowchart illustrating an example of a method for attaching a Cassegrain reflector in the case of performing reflection measurement.

FIG. 7 is a flowchart illustrating an example of a method for attaching the Cassegrain reflector 200 in the case of performing the reflection measurement. In the case of performing the reflection measurement, for example, the upper Cassegrain reflector 200A is installed to face the measurement position P (see FIG. 3) (step S201: an installation step).

Subsequently, when the visible light is irradiated from the visible light source 3 to the measurement position P (step S202), an operator can see the plurality of supporting rods 232 on the optical path. In this state, the operator rotates the upper Cassegrain reflector 200A by the rotation adjustment mechanism 60 about the axial line L while seeing the plurality of supporting rods 232 by eyes or a camera (not illustrated) (step S203).

At this time, the rotational positions are adjusted (step S203: an adjustment step) until the plurality of supporting rods 232 of the upper Cassegrain reflector 200A become line-symmetrical with respect to a boundary line between the first region R1 and the second region R2 of the secondary mirror 202 of the upper Cassegrain reflector 200A when viewed along the axial line L (until Yes in step S204). Then, when the fixing nuts 64 are threaded into the attachment member 63 while the plurality of supporting rods 232 become line-symmetrical with respect to the boundary line (Yes in step S204), the rotational position of the upper Cassegrain reflector 200A is fixed (step S205).

As in the case of the reflection measurement illustrated in FIG. 7, in the case of a configuration in which one Cassegrain reflector 200 (the upper Cassegrain reflector 200A) is used, the light incident to the Cassegrain reflector 200 is reflected by the first region R1 of the secondary mirror 202, is reflected by the primary mirror 201, and is emitted to the measurement position P from the side of the secondary mirror 202, and the light reflected from the sample at the measurement position P is reflected by the primary mirror 201 and is reflected by the second region R2 of the secondary mirror 202 to emit the light, the plurality of supporting rods 232 of the Cassegrain reflector 200 (the upper Cassegrain reflector 200A) are rotated. At this time, when the rotational positions are adjusted so that the plurality of supporting rods 232 become line-symmetrical with respect to the boundary line between the first region R1 and the second region R2 of the secondary mirror 202 when viewed along the axial line L, a light shield state caused by the plurality of supporting rods 232 can be suppressed as small as possible.

As in the microscope 100 illustrated in FIG. 3, in the case of the microscope 100 capable of performing both the reflection measurement and the transmission measurement, the pair of Cassegrain reflectors 200 (the upper Cassegrain reflector 200A and the lower Cassegrain reflector 200B) is coaxially disposed and then the rotational position of the upper Cassegrain reflector 200A is first adjusted as illustrated in FIG. 7. Subsequently, when the rotational position of the lower Cassegrain reflector 200B is adjusted as illustrated in FIG. 6, a light shield state caused by the plurality of supporting rods 232 can be suppressed as small as possible in both the reflection measurement and the transmission measurement.

In the above-described embodiment, a configuration in which the rotation adjustment mechanism 60 (the nut part 62 and the attachment member 63) is attached to the threaded part 242 of the cylindrical member 204 provided in the Cassegrain reflector 200 has been described. However, the invention is not limited to such a configuration. For example, the rotation adjustment mechanism 60 may be attached to a different part of the Cassegrain reflector 200 or a rotation adjustment mechanism capable of adjusting the rotational positions of the plurality of supporting rods 232 may be provided inside the Cassegrain reflector 200.

The fixing part for fixing the rotational positions of the plurality of supporting rods 232 of the Cassegrain reflector 200 is not limited to the fixing nut 64 as in the above-described embodiment and the rotational position may be fixed by other structures.

The Cassegrain reflector retention mechanism 6 according to the invention is not limited to the microscope 100 capable of performing both the reflection measurement and the transmission measurement as in the above-described embodiment and can be also applied to the microscope capable of performing only one of the reflection measurement and the transmission measurement.

The invention claimed is:

1. A Cassegrain reflector retention mechanism for retaining a Cassegrain reflector that includes a primary mirror and a secondary mirror disposed coaxially with the primary mirror and laterally supported by a plurality of supporting rods and is used to reflect light incident from an opening formed on an axial line of the primary mirror by the secondary mirror, reflect the light by the primary mirror, and emit the light to a measurement position from a side of the secondary mirror, comprising:
- a retainer that retains the Cassegrain reflector; and
- a rotation adjustment mechanism that adjusts rotational positions of the plurality of supporting rods of the Cassegrain reflector retained by the retainer about the axial line,
- wherein the Cassegrain reflector is installed coaxially as a pair of Cassegrain reflectors with the measurement position interposed therebetween; and
- wherein the plurality of supporting rods of the pair of Cassegrain reflectors overlap each other when viewed along the axial line rotating the plurality of supporting rods of at least one of the pair of Cassegrain reflectors about the axial line for adjusting rotational position of the pair of Cassegrain reflectors.

2. The Cassegrain reflector retention mechanism according to claim 1,
- wherein the rotation adjustment mechanism includes a fixing part that fixes the rotational positions of the plurality of supporting rods of the Cassegrain reflector.

3. The Cassegrain reflector retention mechanism according to claim 1,
- wherein the Cassegrain reflector is attachable to or detachable from the retainer along with the rotation adjustment mechanism.

4. The Cassegrain reflector retention mechanism according to claim 3,
- wherein the retainer includes a positioning part that prevents the Cassegrain reflector from rotating along with the rotation adjustment mechanism.

5. A microscope comprising:
- the Cassegrain reflector retention mechanism according to claims 1;
- a Cassegrain reflector that is retained by the Cassegrain reflector retention mechanism;
- a light source that irradiates light to a sample through the Cassegrain reflector; and
- a detector that receives reflected light or transmitted light from a sample at the measurement position.

6. The microscope according to claim 5, further comprising:
- an upper Cassegrain reflector that is located above a sample; and
- a lower Cassegrain reflector that is located below the sample,
- wherein at least one of the upper Cassegrain reflector and the lower Cassegrain reflector is retained by the Cassegrain reflector retention mechanism, and
- wherein the upper Cassegrain reflector and the lower Cassegrain reflector are the pair of Cassegrain reflectors.

7. A method for attaching a Cassegrain reflector that includes a primary mirror and a secondary mirror disposed coaxially with the primary mirror and laterally supported by a plurality of supporting rods and is used to reflect light incident from an opening formed on an axial line of the primary mirror by the secondary mirror, reflect the light by the primary mirror, and emit the light to a measurement position from a side of the secondary mirror, comprising:
- an installation step of coaxially installing a pair of the Cassegrain reflectors with the measurement position interposed therebetween; and
- an adjustment step of adjusting rotational positions so that the plurality of supporting rods of the pair of Cassegrain reflectors overlap each other when viewed along the axial line by rotating the plurality of supporting rods of at least one of the pair of Cassegrain reflectors about the axial line.

8. A method for attaching a Cassegrain reflector that includes a primary mirror and a secondary mirror disposed coaxially with the primary mirror and laterally supported by a plurality of supporting rods, is used to reflect light incident from an opening formed on an axial line of the primary mirror by a first region of the secondary mirror, reflect the light by the primary mirror, and emit the light to a measurement position from a side of the secondary mirror, and is used to reflect light reflected from a sample at the measurement position by the primary mirror, reflect the light by a second region of the secondary mirror, and emit the light from the opening, comprising:
- an installation step of installing the Cassegrain reflector to face the measurement position; and
- an adjustment step of adjusting rotational positions so that the plurality of supporting rods become line-symmetrical when viewed along the axial line with respect to a boundary line between the first region and the second region of the secondary mirror by rotating the plurality of supporting rods of the Cassegrain reflector about the axial line,
- wherein the Cassegrain reflector is installed coaxially as a pair of Cassegrain reflectors with the measurement position interposed therebetween; and
- wherein the plurality of supporting rods of the pair of Cassegrain reflectors overlap each other when viewed along the axial line rotating the plurality of supporting rods of at least one of the pair of Cassegrain reflectors about the axial line for adjusting rotational position of the pair of Cassegrain reflectors.

* * * * *